US010845932B2

(12) United States Patent
Ikeda

(10) Patent No.: US 10,845,932 B2
(45) Date of Patent: Nov. 24, 2020

(54) CONDUCTIVE MEMBER AND TOUCH PANEL

(71) Applicant: FUJIFILM Corporation, Tokyo (JP)

(72) Inventor: Reona Ikeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/522,022

(22) Filed: Jul. 25, 2019

(65) Prior Publication Data

US 2019/0346971 A1 Nov. 14, 2019

Related U.S. Application Data

(63) Continuation of application No. PCT/JP2017/045996, filed on Dec. 21, 2017.

(30) Foreign Application Priority Data

Mar. 6, 2017 (JP) .................................. 2017-041947

(51) Int. Cl.
*G06F 3/044* (2006.01)
(52) U.S. Cl.
CPC .......... *G06F 3/0445* (2019.05); *G06F 3/0446* (2019.05); *G06F 2203/04112* (2013.01)
(58) Field of Classification Search
CPC ......... G06F 2203/04112; G06F 3/0445; G06F 3/0446
See application file for complete search history.

(56) References Cited

U.S. PATENT DOCUMENTS 10,649,606 B2* 5/2020 Nakayama ............ G06F 3/0448
2014/0055380 A1 2/2014 Han et al.
2016/0018932 A1 1/2016 Nakayama et al.
(Continued)

FOREIGN PATENT DOCUMENTS

JP 2014-41589 A 3/2014
JP 2014-115694 A 6/2014
JP 2014-191441 A 10/2014
(Continued)

OTHER PUBLICATIONS

International Search Report Issued in PCT/JP2017/045996 dated Apr. 3, 2018.
(Continued)

*Primary Examiner* — Afroza Chowdhury
(74) *Attorney, Agent, or Firm* — Edwards Neils LLC; Jean C. Edwards, Esq.

(57) ABSTRACT

In a conductive member, a first detection electrode portions of a first electrode formed on a first surface of a transparent insulating substrate and a dummy portion in the second electrode of a second electrode formed on a second surface of the transparent insulating substrate are combined with each other to form a first mesh pattern, a second detection electrode portion of the second electrode formed on the second surface of the transparent insulating substrate and a dummy portion in the first electrode of the first electrode formed on the first surface of the transparent insulating substrate are combined with each other to form a second mesh pattern, and the first mesh pattern and the second mesh pattern are combined with each other to form a third mesh pattern.

9 Claims, 8 Drawing Sheets

(56) References Cited

U.S. PATENT DOCUMENTS

2017/0228052 A1  8/2017  Nakamura
2017/0228090 A1  8/2017  Nakamura

FOREIGN PATENT DOCUMENTS

WO    2016/080046 A1    5/2016
WO    2016/084449 A1    6/2016

OTHER PUBLICATIONS

Written Opinion Issued in PCT/JP2017/045996 dated Apr. 3, 2018.
International Preliminary Report on Patentability Issued in PCT/JP2017/045996 dated Sep. 10, 2019.
Office Action, issued by the Japanese Patent Office dated Sep. 8, 2020, in connection with Japanese Patent Application No. 2019-504340.

* cited by examiner

CONDUCTIVE MEMBER AND TOUCH PANEL

CROSS-REFERENCE TO RELATED APPLICATIONS

This application is a Continuation of PCT International Application No. PCT/JP2017/45996, filed on Dec. 21, 2017, which was published under PCT Article 21(2) in Japanese, and which claims priority under 35 U.S.C. § 119(a) to Japanese Patent Application No. 2017-041947, filed on Mar. 6, 2017. The above applications are hereby expressly incorporated by reference, in their entirety, into the present application.

BACKGROUND OF THE INVENTION

1. Field of the Invention

The present invention relates to a conductive member and particularly relates to a conductive member used as a touch sensor.

The present invention also relates to a touch panel using a conductive member.

2. Description of the Related Art

In recent years, in various electronic devices including portable information devices such as tablet computers and smart phones, a touch panel which is used in combination with display devices such as liquid crystal display devices and which performs an input operation on an electronic device by causing members having thin tips such as fingers and stylus pens to be in contact with or be close to a screen is in widespread.

In the touch panel, a conductive member in which a detection portion for detecting a touch operation by causing members having thin tips such as fingers and stylus pens to be in contact with or be close to a transparent substrate is formed is used.

The detection portion is formed of a transparent conductive oxide such as Indium Tin Oxide (ITO), but is also formed of metal other than the transparent conductive oxide. Metal has advantages such as easy patterning, superior bending properties, and lower resistance compared to the above transparent conductive oxides, and thus metal such as copper or silver is used for conductive thin wires for the touch panels.

JP2014-115694A discloses a touch panel using metal fine wires. The touch panel of JP2014-115694A is a capacitance sensor including a substrate, a plurality of Y electrode patterns, a plurality of X electrode patterns, a plurality of jumper insulating layers, a plurality of jumper wires, and a transparent insulating layer. The plurality of Y electrode patterns each have a substantially rhombic shape and are arranged in a matrix along an X direction and a Y direction on a surface of a base material such that peaks thereof face each other. The plurality of X electrode patterns have a substantially rhombus shape the same as the Y electrode patterns. The X electrode pattern and the Y electrode pattern of JP2014-115694A are rhombic mesh patterns.

SUMMARY OF THE INVENTION

In a touch panel using a mesh pattern formed of such thin metal wires, in a case where a mesh pitch is set to a small value, parasitic capacitance of an electrode increases, and as a result, detection sensitivity of a touch position is lowered.

Meanwhile, in a case where the mesh pitch of the metal thin wires is increased in order to improve the detection sensitivity, a problem occurs in that a distance between the adjacent metal thin wires increases, the metal thin wires become more noticeable, and the visibility decreases. In a case where the mesh pitch of the thin metal wire is increased, a problem occurs in that moire caused by interference between a periodic thin pixel pattern of a display device used in combination with the touch panel and the thin metal wires becomes noticeable.

The present invention has been conceived in order to solve such problems in the related art, and has an object of providing a conductive member capable of improving the visibility and suppressing the generation of moire in a case of being used in combination with a display device, even in a case where a detection electrode portion having a wide-pitch mesh pattern with a small parasitic capacitance and high detection sensitivity is used.

The present invention has another object of providing a touch panel comprising such a conductive member.

A conductive member according to the embodiment of the present invention is a conductive member having a transmissive region, comprising: a transparent insulating member; a plurality of first electrodes each of which extends in a first direction and which are arranged in juxtaposition in a second direction orthogonal to the first direction; and a plurality of second electrodes each of which extends in the second direction and which are arranged in juxtaposition in the first direction, in which the plurality of first electrodes and the plurality of second electrodes are opposed to each other with the transparent insulating member interposed therebetween, the first electrode has a first detection electrode portion which is formed of metal fine wires, and a dummy portion in the first electrode which is formed of metal fine wires and arranged to be insulated from the first detection electrode portion, the second electrode has a second detection electrode portion which is formed of metal fine wires, and a dummy portion in the second electrode which is formed of metal fine wires and arranged to be insulated from the second detection electrode portion, and in a region in which the first electrode and the second electrode are overlapped with each other, the first detection electrode portion and the dummy portion in the second electrode are combined with each other to form a first mesh pattern constituted by a plurality of first mesh cells, and the second detection electrode portion and the dummy portion in the first electrode are combined with each other to form a second mesh pattern constituted by a plurality of second mesh cells, and the first mesh pattern and the second mesh pattern are combined with each other to form a third mesh pattern constituted by a plurality of third mesh cells.

It is preferable that the first mesh pattern has a first mesh pitch, the second mesh pattern has a second mesh pitch, the metal fine wires that form the first mesh pattern and the metal fine wires that form the second mesh pattern are arranged at positions different from each other except for a portion in which the fine wires are overlapped with each other in a dot shape, and the third mesh pattern has a third mesh pitch smaller than the first mesh pitch and the second mesh pitch.

It is preferable that the first mesh pitch and the second mesh pitch are the same, the second mesh pattern is arranged at a position deviated by ½ of the first mesh pitch from the first mesh pattern, and the third mesh pitch has a value of ½ of each of the first mesh pitch and the second mesh pitch.

It is preferable that the first detection electrode portion has a repeating pattern in which a first detection unit pattern is used as a constitutional unit, the dummy portion in the first electrode has a repeating pattern in which a first dummy unit pattern arranged in the first detection unit pattern is used as a constitutional unit, the second detection electrode portion has a repeating pattern in which a second detection unit pattern having the same size as the first detection unit pattern is used as a constitutional unit, and the dummy portion in the second electrode has a repeating pattern in which a second dummy unit pattern arranged in the second detection unit pattern is used as a constitutional unit.

It is preferable that the first mesh cell, the second mesh cell, and the third mesh cell have a shape of quadrangle. In this case, it is preferable that the quadrangle is a rhombus. The first mesh cell and the second mesh cell may have the same shape.

A length of a side of the third mesh cell can be constituted to have an irregular value of −10% to +10% with respect to an average value of a length of a side of the plurality of third mesh cells constituting the third mesh pattern.

A touch panel according to the embodiment of the present invention is a touch panel using the conductive member.

According to the present invention, a first detection electrode portion arranged on a first surface of a transparent insulating substrate and a dummy portion in a second electrode arranged on a second surface of the transparent insulating substrate are combined with each other to form a first mesh pattern constituted by the plurality of first mesh cells, a second detection electrode portion arranged on the second surface of the transparent insulating substrate and a dummy portion in the first electrode arranged on the first surface of the transparent insulating substrate are combined with each other to form a second mesh pattern constituted by the plurality of second mesh cells, and the first mesh pattern and the second mesh pattern are combined with each other to form a third mesh pattern constituted by a plurality of third mesh cells. Therefore, it becomes possible to suppress generation of moire in a case of being used in combination with a display device, together with improving the visibility, even in a case where a detection electrode portion having a mesh pattern with a small parasitic capacitance, high detection sensitivity, and a wide pitch is used.

DESCRIPTION OF THE PREFERRED EMBODIMENTS

Hereinafter, a conductive member and a touch panel according to the embodiment of the present invention are specifically described based on preferred embodiments illustrated in the accompanying drawings.

Hereinafter, the expression "to" exhibiting a numerical value range includes numerical values indicated on both sides. For example, "s is a numerical value t1 to a numerical value t2" means that the range of s is a range including the numerical value t1 and the numerical value t2, and in a case of indicating the values with mathematical symbols, t1≤s≤t2.

Unless otherwise described, an angle including "orthogonal", "parallel", and the like includes generally accepted error ranges in the art.

"Transparent" means that the light transmittance is at least 40% or more, preferably 75% or more, more preferably 80% or more, and even more preferably 90% or more with respect to the visible light wavelength range of 400 to 800 nm. The light transmittance is measured by using "plastic—a method of obtaining total light transmittance and total light reflectance" regulated in K 7375:2008.

Figure 1:
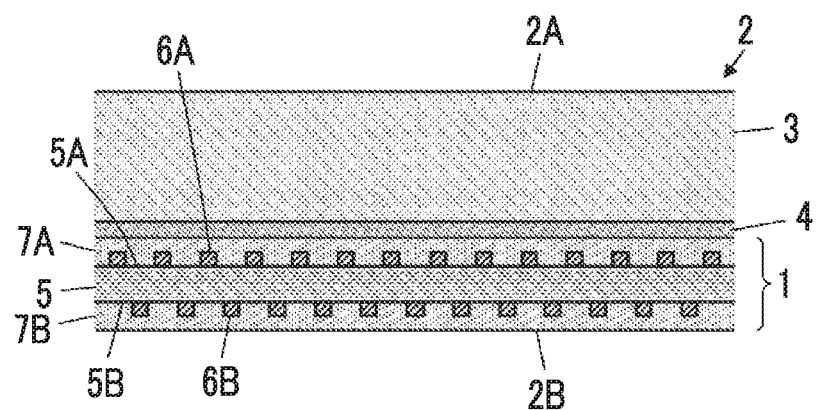
FIG. 1 is a partial cross sectional view illustrating a touch panel in which a conductive member according to an embodiment of the present invention is used.

FIG. 1 illustrates a configuration of a touch panel 2 in which a conductive member 1 according to the embodiment of the present invention is used.

The touch panel 2 has a front surface 2A and a back surface 2B, and is used in a state in which a display device (not illustrated) such as a liquid crystal display device is arranged on the back surface 2B side. The front surface 2A of the touch panel 2 is a touch detection surface, and becomes a viewing side on which an operator of the touch panel 2 observes an image of the display device through the touch panel 2.

The touch panel 2 has a transparent insulating cover panel 3 having a flat plate shape, which is arranged on the front surface 2A, and the conductive member 1 is bonded to a surface of the cover panel 3 opposite to the front surface 2A via a transparent adhesive 4.

In the conductive member 1, metal fine wires CA and metal fine wires CB are respectively formed on both surfaces of a transparent insulating substrate 5 which is a transparent insulating member. The transparent insulating substrate 5 has a first surface 5A of the transparent insulating substrate 5 that faces the front surface 2A side of the touch panel 2 and a second surface 5B of the transparent insulating substrate 5 that faces the back surface 2B side of the touch panel 2, and the metal fine wires 6A is formed on the first surface 5A, and the metal fine wires 6B are formed on the second surface 5B. As illustrated in FIG. 1, for the purpose of flattening or protecting the flattened metal fine wires 6A and 6B, so as to cover the metal fine wires 6A and 6B, transparent protective layers 7A and 7B are respectively arranged on the first surface 5A and the second surface 5B of the transparent insulating substrate 5.

Figure 2:
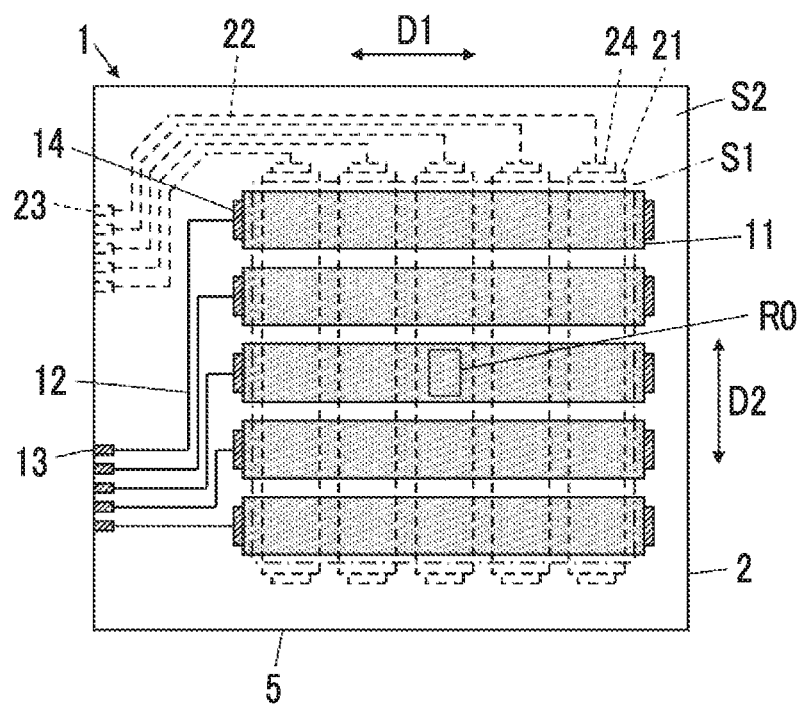
FIG. 2 is a plan view illustrating a conductive member according to the embodiment.

As illustrated in FIG. 2, in the conductive member 1, a transmissive region S1 is partitioned, and an edge part region S2 is partitioned on the outside of the transmissive region S1.

The plurality of first electrodes 11 which are constituted by the metal fine wires 6A, respectively extend along a first direction D1, and are arranged in juxtaposition with a second direction D2 orthogonal to the first direction D1 are formed on the first surface 5A of the transparent insulating substrate 5, and the plurality of second electrodes 21 which are constituted by the metal fine wires 6B, respectively extend along the second direction D2, and are arranged in juxtaposition with the first direction D1 are formed on the second surface 5B of the transparent insulating substrate 5. In this manner, the plurality of first electrodes 11 and the plurality of second electrodes 21 are arranged via the transparent insulating substrate 5.

The first electrodes 11 formed on the first surface 5A (viewing side) of the transparent insulating substrate 5 and the second electrodes 21 formed on the second surface 5B (display device side) of the transparent insulating substrate 5 are arranged on the transmissive region S1 so as to intersect with each other in an overlapping manner.

Meanwhile, a plurality of first edge part wires 12 connected to the plurality of first electrodes 11 are formed on the first surface 5A of the transparent insulating substrate 5 in the edge part region S2. A plurality of first external connection terminals 13 are formed in an array in an edge portion of the transparent insulating substrate 5, and the first connector portions 14 are formed on end portions of the first electrodes 11. One end portions of the corresponding first edge part wires 12 are connected to first connector portions 14, and the other end portions of the first edge part wires 12 are connected to the corresponding first external connection terminals 13.

In the same manner, a plurality of second edge part wires 22 that are connected to the plurality of second electrodes 21 are formed on the second surface 5B of the transparent insulating substrate 5 in the edge part region S2. The plurality of second external connection terminals 23 are formed in an array in the edge portion of the transparent insulating substrate 5, and second connector portions 24 are respectively formed in the end portions of the second electrodes 21. One end portions of the corresponding second edge part wires 22 are connected to the second connector portions 24, and the other end portions of the second edge part wires 22 are connected to the corresponding second external connection terminals 23.

Figure 3:
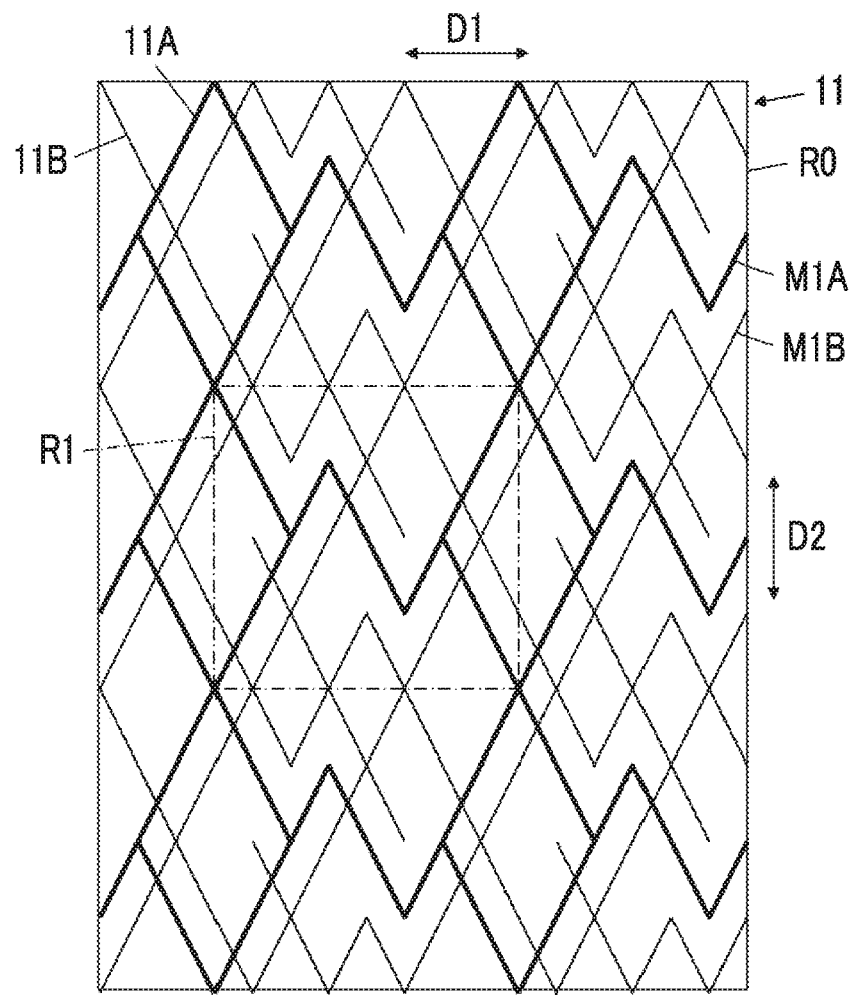
FIG. 3 is a partial plan view illustrating only a first electrode in an electrode intersection portion of the conductive member according to the embodiment seen from viewing side.

FIG. 3 illustrates a partial plan view of only the first electrode 11 in a region R0 in an electrode intersection portion, in which the first electrodes 11 and the second electrodes 21 are overlapped with each other, seen from viewing side.

The first electrode 11 has first detection electrode portions 11A which are drawn by relatively thick lines in FIG. 3 and dummy portions 11B in the first electrode which are drawn by relatively thin lines in FIG. 3. The first detection electrode portions 11A and the dummy portions 11B in the first electrode are respectively formed of metal fine wires M1A and metal fine wires M1B, and the dummy portions 11B in the first electrode are arranged so as to be not electrically connected to the first detection electrode portions 11A and be insulated from the first detection electrode portions 11A.

Figure 4:
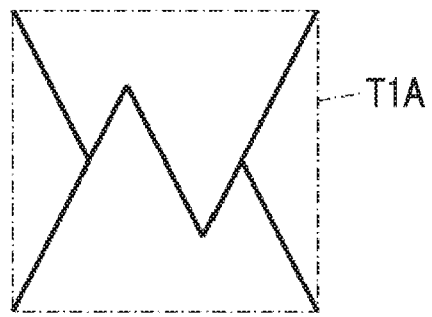
FIG. 4 is a plan view illustrating a first detection unit pattern of a first detection electrode portion of the first electrode seen from viewing side.
Figure 5:
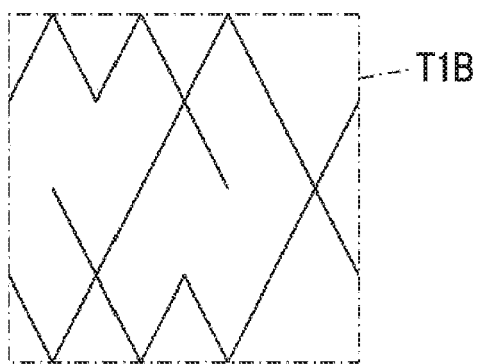
FIG. 5 is a plan view illustrating a first dummy unit pattern of a dummy portion in the first electrode of the first electrode seen from viewing side.

The first detection electrode portions 11A has a repeating pattern in which a first detection unit pattern T1A is used as a constitutional unit as illustrated in FIG. 4, and the dummy portion 11B in the first electrode has a repeating pattern in which a first dummy unit pattern T1B is used as a constitutional unit as illustrated in FIG. 5. A repeating pattern is preferably used, since the mesh pattern of the electrode can be easily designed. For example, all of the first detection unit pattern T1A and the first dummy unit pattern T1B are patterns formed of the metal fine wires M1A of the first detection electrode portions 11A and the metal fine wire M1B of the dummy portions 11B in the first electrode that are present in a region R1 as illustrated in FIG. 3, and sizes thereof are identical to each other.

Figure 6:
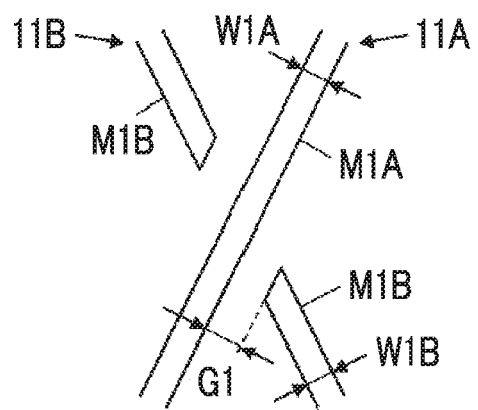
FIG. 6 is a partial enlarged plan view illustrating metal fine wires forming the first detection electrode portion of the first electrode and metal fine wires forming the dummy portion in the first electrode.

As illustrated in FIG. 6, in order to secure visibility, it is desirable that a line width W1A of the metal fine wires M1A that form the first detection electrode portions 11A and a line width W1B of the metal fine wires M1B that form the dummy portions 11B in the first electrode is set, for example, in the range of 10 μm or less and particularly in the range of 0.5 μm to 5 μm. In the present specification, the expression to "secure visibility" means that, in a case where the conductive member 1 is used in the touch panel 2 illustrated in FIG. 1, the presence of the metal fine wires M1A and M1B is not observed with bare eyes, and an image of a display device (not illustrated) is clearly checked through the conductive member 1.

The line width W1A of the metal fine wires M1A that form the first detection electrode portions 11A and the line width W1B of the metal fine wires M1B that form the dummy portions 11B in the first electrode are preferably the same value with each other, but may be different from each other.

In FIG. 3, there are a plurality of false intersection points that are seen as the metal fine wires M1A that form the first detection electrode portions 11A and the metal fine wires M1B that form the dummy portions 11B in the first electrode intersect with each other, but, as illustrated in FIG. 6, even in the false intersection points, the metal fine wires M1A and the metal fine wires M1B are spaced from each other to have gaps G1 and are not in contact with each other. Therefore, the metal fine wires M1A that form the first detection electrode portions 11A and the metal fine wires M1B that form the dummy portions 11B in the first electrode are formed on the same surface (the first surface 5A) of the transparent insulating substrate 5 but are in a state of being electrically insulated from each other. The gap G1 between the metal fine wires M1A and the metal fine wire M1B can be set to a value of, for example, 0.1 μm to 50 μm, preferably 0.5 µm to 40 µm, more preferably 1.0 µm to 30 µm, and even more preferably 3.0 µm to 25 µm.

Figure 7:
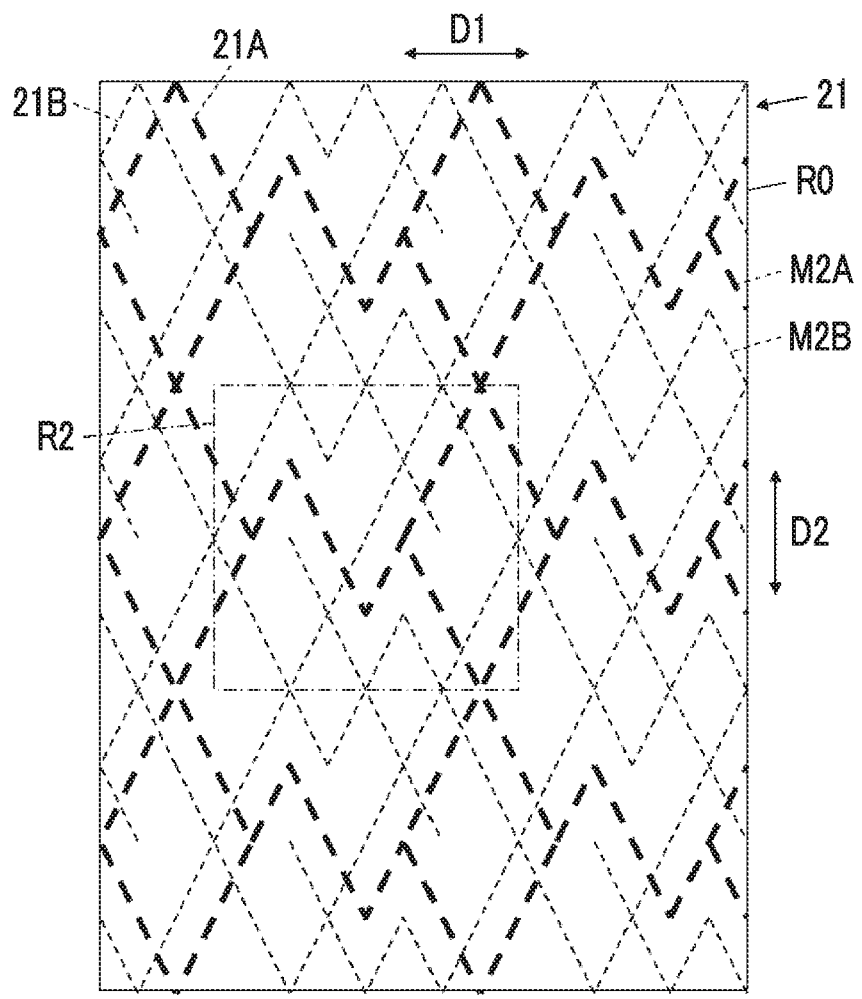
FIG. 7 is a partial plan view illustrating only a second electrode in an electrode intersection portion of the conductive member according to the embodiment seen from viewing side.

FIG. 7 illustrates a partial plan view in which only the second electrode 21 in the region R0 in the electrode intersection portion in which the first electrode 11 and the second electrode 21 are overlapped with each other is seen from a viewing side.

The second electrode 21 has second detection electrode portions 21A drawn by relatively thick broken lines in FIG. 7 and dummy portions 21B in the second electrode drawn by relatively thin broken lines in FIG. 7. The second detection electrode portions 21A and the dummy portions 21B in the second electrode are respectively formed of metal fine wires M2A and metal fine wires M2B, and the dummy portions 21B in the second electrode are arranged so as to be not electrically connected to the second detection electrode portions 21A and be insulated from the second detection electrode portions 21A.

Figure 8:
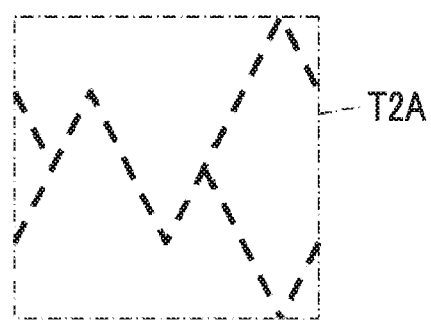
FIG. 8 is a plan view illustrating a second detection unit pattern of a second detection electrode portion of the second electrode seen from viewing side.
Figure 9:
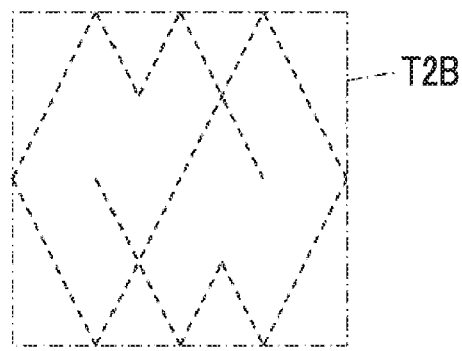
FIG. 9 is a plan view illustrating a second dummy unit pattern of a dummy portion in the second electrode of the second electrode seen from viewing side.

The second detection electrode portion 21A has a repeating pattern in which the second detection unit pattern T2A illustrated in FIG. 8 is used as a constitutional unit, and the dummy portion 21B in the second electrode has a repeating pattern in which the second dummy unit pattern T2B illustrated in FIG. 9 is used as a constitutional unit. A repeating pattern is preferably used, since the mesh pattern of the electrode can be easily designed. The second detection unit pattern T2A and the second dummy unit pattern T2B are patterns formed of the metal fine wires M2A of the second detection electrode portion 21A and the metal fine wires M2B of the dummy portions 21B in the second electrode which are present in a region R2 illustrated in FIG. 7 and the first detection unit pattern T1A of the first detection electrode portion 11A of the first electrode 11 illustrated in FIG. 4 and the first dummy unit pattern T1B of the dummy portion 11B in the first electrode of the first electrode 11 illustrated in FIG. 5 have the same size.

Figure 10:
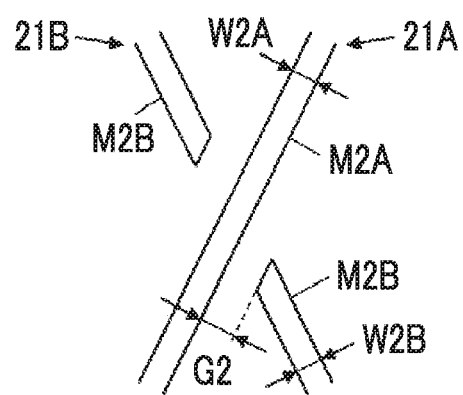
FIG. 10 is a partial enlarged plan view illustrating metal fine wires forming the second detection electrode portion of the second electrode and metal fine wires forming the dummy portion in the second electrode.

As illustrated in FIG. 10, in order to secure visibility, it is desirable that a line width W2A of the metal fine wires M2A that form the second detection electrode portions 21A and a line width W2B of the metal fine wires M2B that form the dummy portions 21B in the second electrode is set, for example, in the range of 10 µm or less and particularly in the range of 0.5 µm to 5 µm.

The line width W2A of the metal fine wires M2A that form the second detection electrode portions 21A and the line width W2B of the metal fine wires M2B that form the dummy portions 21B in the second electrode are preferably the same value with each other, but may be different from each other.

In FIG. 7, there are a plurality of false intersection points that are seen as the metal fine wires M2A that form the second detection electrode portions 21A and the metal fine wires M2B that form the dummy portions 21B in the second electrode intersect with each other, but, as illustrated in FIG. 10, even in the false intersection points, the metal fine wires M2A and the metal fine wires M2B are spaced from each other to have gaps G2 and are not in contact with each other. Therefore, the metal fine wires M2A that form the second detection electrode portions 21A and the metal fine wires M2B that form the dummy portions 21B in the second electrode are formed on the same surface (the second surface 5B) of the transparent insulating substrate 5 but are in a state of being electrically insulated from each other. The gap G2 between the metal fine wires M2A and the metal fine wire M2B can be set to a value of, for example, 0.1 µm to 50 µm, preferably 0.5 µm to 40 µm, more preferably 1.0 µm to 30 µm, and even more preferably 3.0 µm to 25 µm.

Figure 11:
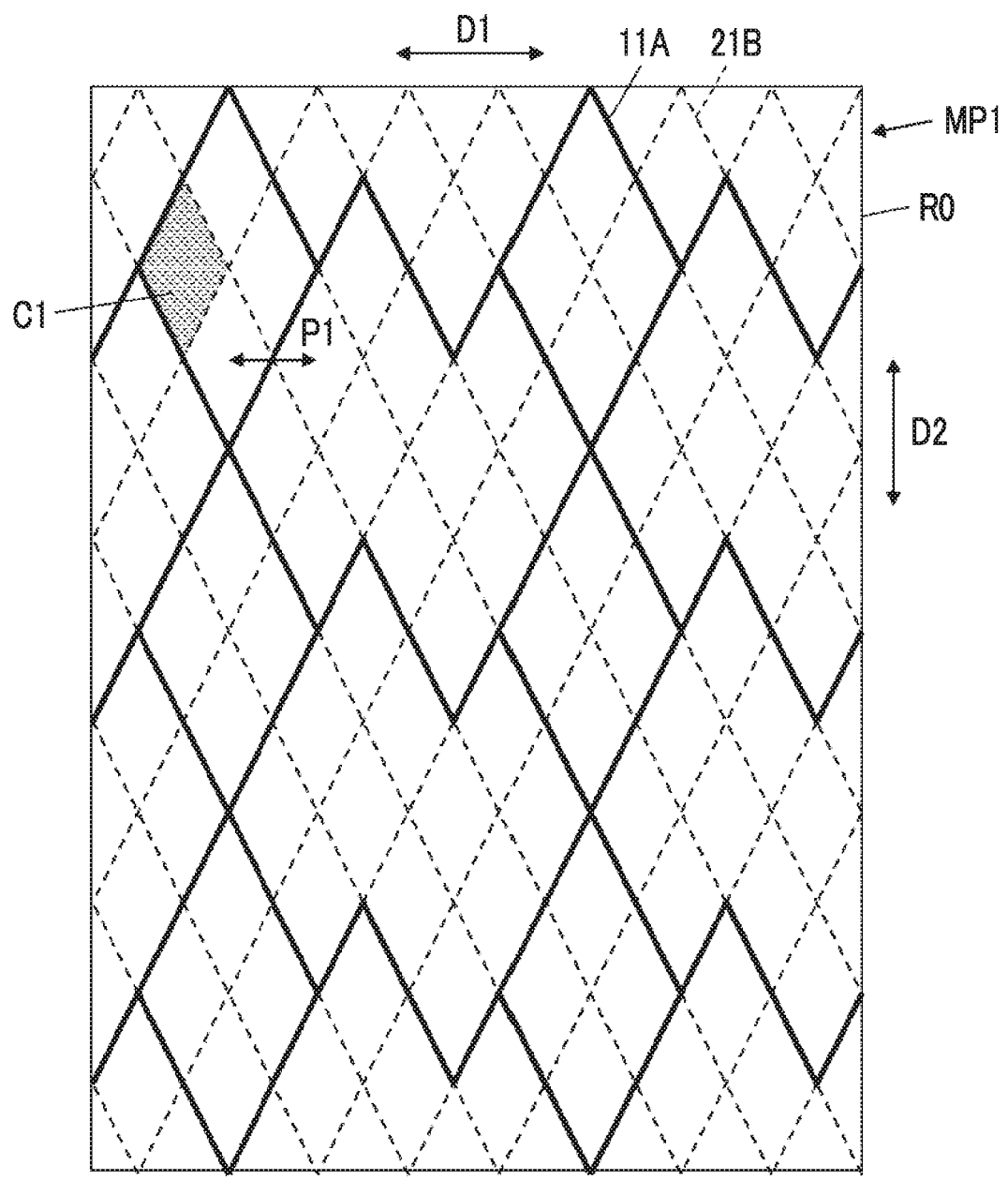
FIG. 11 is a partial plan view illustrating a first mesh pattern formed of the first detection electrode portion of the first electrode and a dummy portion in the second electrode of the second electrode in the electrode intersection portion of the conductive member according to the embodiment seen from viewing side.

In the region R0 in the electrode intersection portion in which the first electrode 11 and the second electrode 21 are overlapped with each other, in a case where the first detection electrode portions 11A of the first electrodes 11 that are formed on the first surface 5A of the transparent insulating substrate 5 and the dummy portions 21B in the second electrode of the second electrodes 21 that are formed on the second surface 5B of the transparent insulating substrate 5 are combined with each other in a case of being seen on the viewing side, as illustrated in FIG. 11, so as to form the first mesh pattern MP1. A first mesh pattern MP1 is a mesh pattern having a first mesh pitch P1 which is formed by using the rhombic first mesh cells C1 as constitutional units. Here, the first mesh pitch P1 is defined as a distance in the first direction D1 between centers of the first mesh cells C1 adjacent to each other in the first direction D1.

Figure 12:
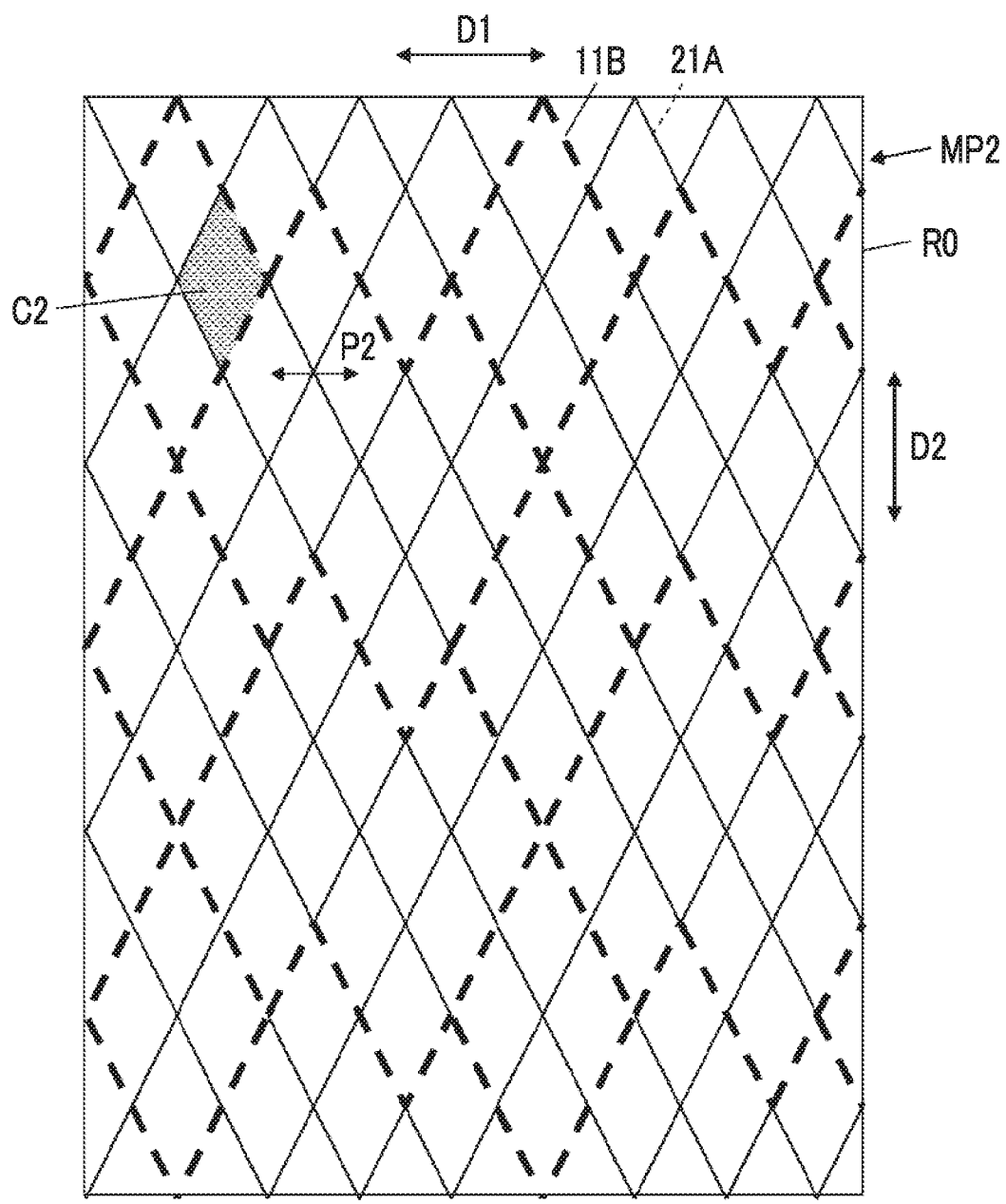
FIG. 12 is a partial plan view illustrating a second mesh pattern formed of a dummy portion in the first electrode of the first electrode and the second detection electrode of the second electrode in the electrode intersection portion of the conductive member according to the embodiment seen from viewing side.

In the region R0 in the electrode intersection portion in which the first electrode 11 and the second electrode 21 are overlapped with each other, in a case where the second detection electrode portions 21A of the second electrodes 21 that are formed on the second surface 5B of the transparent insulating substrate 5 and the dummy portions 11B in the first electrode of the first electrodes 11 that are formed on the first surface 5A of the transparent insulating substrate 5 are combined with each other in a case of being seen on the viewing side, as illustrated in FIG. 12, so as to form the second mesh pattern MP2. A second mesh pattern MP2 is a mesh pattern having a second mesh pitch P2 which is formed by using the rhombic second mesh cells C2 as constitutional units, in the same manner as in the first mesh pattern MP1. Here, the second mesh pitch P2 is defined as a distance in the first direction D1 between centers of the second mesh cells C2 adjacent to each other in the first direction D1.

It is preferable that the first mesh cell C1 and the second mesh cell C2 have the same shape, because the sensitivity uniformity of the touch panel is improved, and the mesh pattern of the electrode can be simply and easily designed. In view of the moire suppression in a case of being used in combination with a display device, the shape of the first mesh cell C1 and the second mesh cell C2 is preferably a rhombus.

The second mesh pitch P2 can be set to a value different from the first mesh pitch P1, but it is preferable that the second mesh pitch P2 is the same as the first mesh pitch P1, because uniformity of the sensitivity of the touch panel is improved, and the visibility is improved. Hereinafter, an example in which the first mesh pitch P1 and the second mesh pitch P2 are the same, and the shapes of the first mesh cell C1 and the second mesh cell C2 are the same rhombus is described.

Figure 13:
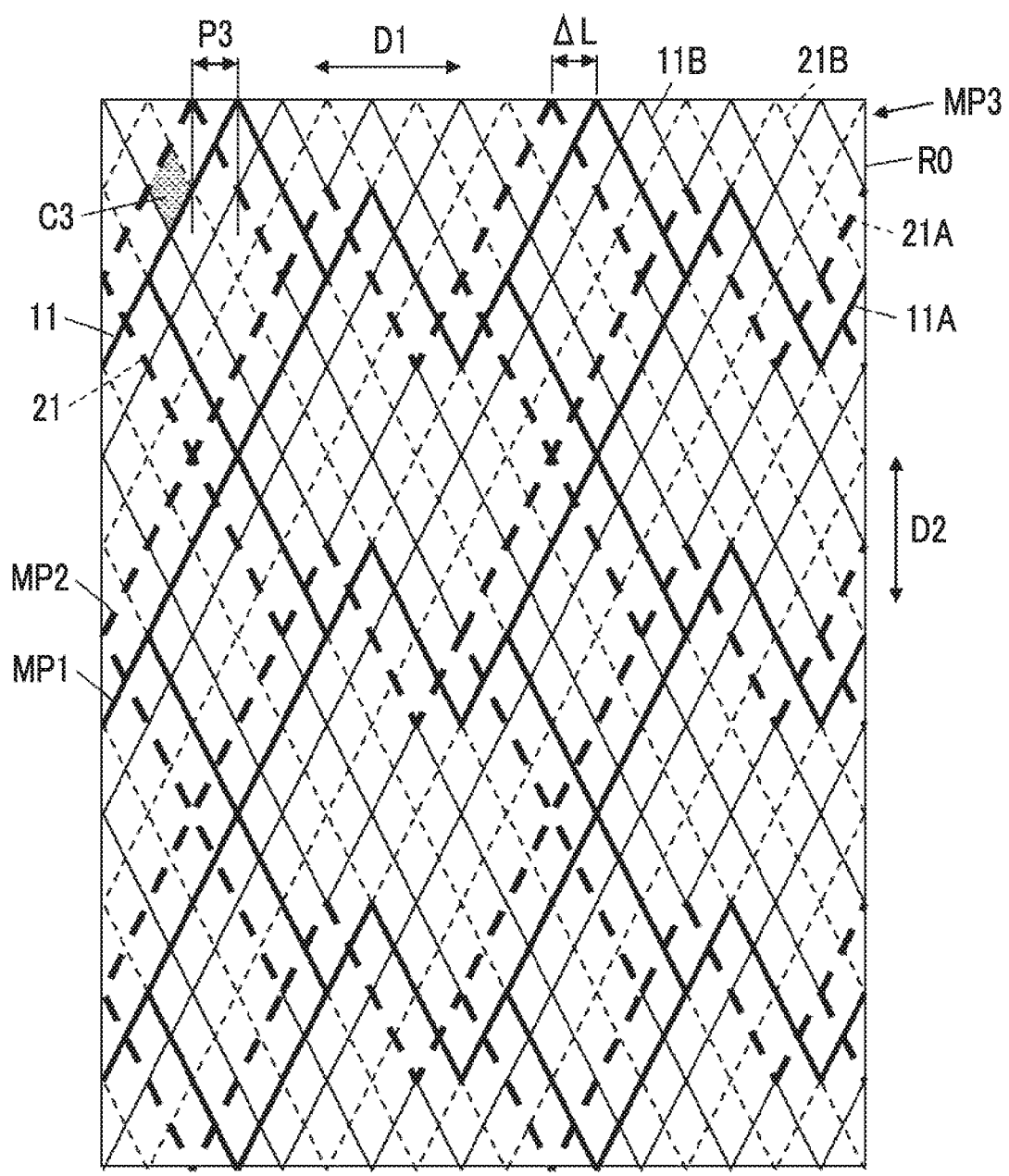
FIG. 13 is a partial plan view illustrating a third mesh pattern formed of the first electrode and the second electrode in the electrode intersection portion of the conductive member according to the embodiment seen from viewing side.

Here, the second mesh pattern MP2 is arranged in a position of being deviated by ½ of the first mesh pitch P1 with respect to the first mesh pattern MP1, and thus, in the region R0 in the electrode intersection portion, in a case where the first electrodes 11 that are formed on the first surface 5A of the transparent insulating substrate 5 and the second electrodes 21 that are formed on the second surface 5B of the transparent insulating substrate 5 are seen on the viewing side, as illustrated in FIG. 13, the first mesh pattern MP1 and the second mesh pattern MP2 are combined with each other so as to form the third mesh pattern MP3. A metal fine wire that forms the first mesh pattern MP1 and a metal fine wire that forms the second mesh pattern MP2 are arranged so as to be overlapped with each other in a dot shape.

Specifically, by causing the second mesh pattern MP2 to be arranged in a position deviated by a distance ΔL from the first mesh pattern MP1 in the first direction D1, relative positions of the first mesh pattern MP1 and the second mesh pattern MP2 are set such that an interval between the metal fine wire that forms the second mesh pattern MP2 and the metal fine wire that is adjacent to this metal fine wire and forms the first mesh pattern MP1 becomes ½ of the first mesh pitch P1. According to the arrangement, the parasitic capacitance in the intersection portion of the first electrode 11 and the second electrode 21 can be decreased, and the sensitivity of the touch panel can be improved.

A third mesh pattern MP3 is a mesh pattern having a third mesh pitch P3 which is formed by using the rhombic third mesh cells C3 as constitutional units. Here, the third mesh pitch P3 is defined as a distance in the first direction D1 between centers of the third mesh cells C3 adjacent to each other in the first direction D1. The third mesh pitch P3 has a value of ½ of each of the first mesh pitch P1 of the first mesh pattern MP1 and the second mesh pitch MP2 of the second mesh pitch P2.

In this manner, the first detection electrode portions 11A of the first electrode 11 formed on the first surface 5A of the transparent insulating substrate 5 and the dummy portion 21B in the second electrode of the second electrode 21 formed on the second surface 5B of the transparent insulating substrate 5 are combined with each other seen from the viewing side so as to form the first mesh pattern MP1, and the second detection electrode portion 21A of the second electrode 21 formed on the second surface 5B of the transparent insulating substrate 5 and the dummy portion 11B in the first electrode of the first electrode 11 formed on the first surface 5A of the transparent insulating substrate 5 are combined with each other seen from the viewing side so as to form the second mesh pattern MP2. The first mesh pattern MP1 and the second mesh pattern MP2 are combined with each other seen from the viewing side so as to form the third mesh pattern MP3.

Therefore, the first detection electrode portions 11A of the first electrode 11 and the second detection electrode portion 21A of the second electrode 21 which are used for detecting a touch operation can form a repeating pattern having a larger size, compared with the first mesh cell C1 of the first mesh pattern MP1, the second mesh cell C2 of the second mesh pattern MP2, and the third mesh cell C3 of the third mesh pattern MP3.

Accordingly, in a case of being seen from the viewing side, the interval of the adjacent metal fine wires M1A, M1B, M2A, and M2B can be narrowed down such that the presence of the metal fine wires M1A, M1B, M2A, and M2B become invisible, and the size and the angle of the third mesh cell C3 are selected to design the third mesh pattern MP3 such that the generation of the moire in a case of using a display device in combination with the touch panel 2 is decreased. Therefore, the parasitic capacitances of the first detection electrode portions 11A and the second detection electrode portions 21A can be reduced. That is, it becomes possible to increase detection sensitivity at a touch position while improving the visibility and decreasing the moire generation.

A configuration of having a dummy electrode electrically insulated from the first detection electrode portions 11A of these first electrodes 11 in a region between the plurality of first electrodes 11 which are arranged in juxtaposition on the first surface 5A of the transparent insulating substrate 5 and having a dummy electrode electrically insulated from the second detection electrode portions 21A of these second electrodes 21 in the region between the plurality of second electrodes 21 which are arranged in juxtaposition on the second surface 5B of the transparent insulating substrate 5.

The dummy electrode positioned between the plurality of first electrodes 11 is formed of metal fine wires so as to have a repeating pattern by both of the first detection electrode portions 11A and the dummy portion 11B in the first electrode of the first electrode 11 as illustrated in FIG. 3, and the dummy electrode positioned between the plurality of second electrodes 21 is formed of metal fine wires having a repeating pattern by both of the second detection electrode portion 21A and the dummy portion 21B in the second electrode of the second electrode 21 as illustrated in FIG. 7. The insulation between the first electrode 11 and the dummy electrode and the insulation between the second electrode 21 and the dummy electrode are formed by providing a disconnected portion having a disconnected width of 0.5 to 30 μm in the metal thin wire. A plurality of disconnected portions may be further provided inside the metal fine wires constituting a dummy electrode, so as to cause the dummy electrode to be an insulating region.

In a case where such a dummy electrode is formed on each of the first surface 5A and the second surface 5B of the transparent insulating substrate 5, in a case of being seen from the viewing side, not only on the electrode intersection portion in which the first electrodes 11 and the second electrodes 21 are overlapped with each other, but also on the entire surface of the transmissive region S1, the third mesh pattern MP3 illustrated in FIG. 13 is formed, such that the pattern appearance of the first electrodes 11 and the second electrodes 21 can be prevented, and also the improvement of the visibility and the decrease of the moire generation can be realized.

Hereinafter, each member constituting the conductive member 1 is described.

<Transparent Insulating Substrate>

The transparent insulating substrate 5 is not particularly limited, as long as the transparent insulating substrate is transparent, has electric insulation properties, and supports the first electrodes 11 and the second electrodes 21, but as the material constituting the transparent insulating substrate 5, for example, tempered glass, alkali free glass, polyethylene terephthalate (PET), polyethylene naphthalate (PEN), a cyclo-olefin polymer (COP), a cyclic olefin copolymer (COC), polycarbonate (PC), an acrylic resin, polyethylene (PE), polypropylene (PP), polystyrene (PS), polyvinyl chloride (PVC), polyvinylidene chloride (PVDC), and triacetyl cellulose (TAC) can be used. For example, the thickness of the transparent insulating substrate 5 is preferably 20 to 1,100 μm. Particularly, in a case of an organic resin substrate of PET or the like, the thickness is preferably 30 to 100 μm.

The total light transmittance of the transparent insulating substrate 5 is preferably 40% to 100%. The light transmittance is measured by using "plastic—a method of obtaining total light transmittance and total light reflectance" regulated in JIS K 7375:2008.

One of the preferred embodiments of the transparent insulating substrate 5 is a treated substrate that has been subjected to at least one treatment selected from the group consisting of an atmospheric pressure plasma treatment, a corona discharge treatment, and an ultraviolet irradiation treatment. By performing the above treatment, a hydrophilic group such as an OH group is introduced to the front surface of the treated transparent insulating substrate 5, and adhesiveness between the first electrodes 11 and the second electrodes 21 is improved. Among the above treatments, in view of improving the adhesiveness between the first electrodes 11 and the second electrodes 21, an atmospheric pressure plasma treatment is preferable.

Another preferred aspect of the transparent insulating substrate 5 preferably has undercoat layers including polymers on the first surface 5A on which the first electrodes 11 are formed and the second surface 5B on which the second electrodes 21 are formed. In a case where photosensitive layers for forming the first electrode 11 and the second electrode 21 are formed on this undercoat layer, adhesiveness between the first electrode 11 and the first surface 5A and between the second electrode 21 and the second surface 5B are further improved.

The method of forming the undercoat layer is not particularly limited, but examples thereof include a method of coating a substrate with a composition for forming an undercoat layer including a polymer, and performing a heat treatment, if necessary. The composition for forming an undercoat layer may include a solvent, if necessary. The types of the solvent are not particularly limited, but examples thereof include a solvent used in the composition for forming a photosensitive layer described below. Gelatin, an acrylic resin, a urethane resin, an acry.styrene-based latex including fine particles of an inorganic or polymer may be used as the composition for forming an undercoat layer including a polymer may be used.

The thickness of the undercoat layer is not particularly limited, but in view of causing the adhesiveness of the first electrode 11 and the second electrode 21 with the transparent insulating substrate 5 to be excellent, the thickness is preferably 0.02 to 0.3 µm and more preferably 0.03 to 0.2 µm.

If necessary, the conductive member 1 may include an antihalation layer in addition to the above undercoat layer, as another layer between the transparent insulating substrate 5 and the first electrode 11 and the second electrode 21.

<Metal Fine Wire>

With reference to FIGS. 6 and 10, as described above, in order to secure visibility, it is desirable that the metal fine wire M1A that forms the first detection electrode portion 11A of the first electrode 11, the metal fine wire M1B that forms the dummy portions 11B in the first electrode, the metal fine wire M2A that forms the second detection electrode portion 21A of the second electrode 21, and the metal fine wire M2B that forms the dummy portions 21B in the second electrode, for example, have a line width set in the range of 0.5 to 5 µm. In a case where the metal fine wires M1A, M1B, M2A, and M2B have such a line width, the first detection electrode portions 11A and the second detection electrode portions 21A which have low resistances can be comparatively easily formed.

The thicknesses of the metal fine wires M1A, M1B, M2A, and M2B are not particularly limited, but the thickness is preferably 1 to 200 µm, more preferably 10 µm or less, even more preferably 2 µm or less, particularly preferably 0.01 to 2 µm, and most preferably 0.05 to 1 µm. Accordingly, the resistance reduction of the first detection electrode portion 11A and the second detection electrode portion 21A and improvement of the durability of the first detection electrode portions 11A, the dummy portions 11B in the first electrode, the second detection electrode portions 21A, and the dummy portions 21B in the second electrode can be comparatively easily realized.

The metal fine wires M1A, M1B, M2A, and M2B use metal or alloy as a forming material and can be formed of, for example, copper, aluminum, or silver. It is preferable that the metal fine wires M1A, M1B, M2A, and M2B include metallic silver, but may include metals other than metallic silver such as gold and copper. It is preferable that the metal fine wires M1A, M1B, M2A, and M2B include metallic silver gelatin, and a polymer binder such as an acry.styrene-based latex, which are suitable for forming a mesh pattern. Other preferable examples include metal of copper, aluminum, silver, molybdenum, and titanium and an alloy thereof. A lamination layer structure thereof may be used, and for example, the metal fine wires of the lamination layer structure of molybdenum/aluminum/molybdenum can be used.

For example, the metal fine wires M1A, M1B, M2A, and M2B may include metal oxide particles, a metal paste such as a silver paste and a copper paste, and metal nanowire particles such as silver nanowires and copper nanowires.

In order to improve the visibility of the metal fine wires, a blackening layer may be formed at least on the viewing side of the metal fine wires. As the blackening layer, metal oxide, metal nitride, metal oxynitrides, and metal sulfide and the like are used, and typically, copper oxynitride, copper nitride, copper oxide, molybdenum oxide, and the like can be used.

The size of the third mesh pitch P3 of the third mesh pattern MP3 that is formed by combining the first mesh pattern MP1 and the second mesh pattern MP2 with each other is not particularly limited, but in consideration of visibility, the size is preferably 50 to 500 µm and more preferably 150 to 300 µm.

In view of suppressing the moire of the display device in a case of being used in combination with a display device, the first mesh cell C1 as the constitutional unit of the first mesh pattern MP1, the second mesh cell C2 as the constitutional unit of the second mesh pattern MP2, and the third mesh cell C3 as the constitutional unit of the third mesh pattern MP3 are preferably quadrangles and particularly preferably rhombuses. The size of the acute angle of this rhombus is, for example, 10 degrees to 88 degrees, preferably 30 degrees to 88 degrees, more preferably 40 degrees to 88 degrees, and even more preferably 50 degrees to 88 degrees.

The third mesh pattern MP3 illustrated in FIG. 13 is a fixed pattern in which the plurality of third mesh cells C3 are arranged in the first direction D1 and the second direction D2, respectively, but the present invention is not limited thereto and may be an irregular pattern.

The third mesh pattern MP3 has a polygonal shape having lengths of irregular sides of −10% to +10%, particularly, an irregular shape constituted by the quadrangular third mesh cells, with respect to the average value of the lengths of the sides of the plurality of third mesh cells C3 constituting the third mesh pattern MP3. According to the above configuration, it is possible to achieve both of the decrease of moire and color noise reduction in a case of being combined with a display device.

In a case of calculating the average value of the lengths of the sides of the plurality of third mesh cells C3, an average value of the lengths of the sides with respect to the plurality of third mesh cells C3 arranged in the area having the defined area can be calculated. For example, it is preferable to calculate the average value of the side length with respect to the plurality of third mesh cells C3 arranged in a region of 10 mm×10 mm.

In order to cause the third mesh pattern MP3 to be such an irregular pattern, the third mesh pattern MP3 can also be formed by using the first mesh pattern MP1 formed by the plurality of first mesh cells C1 having irregular shapes and the second mesh pattern MP2 formed by the plurality of second mesh cells C2 having irregular shapes. In this case, the first mesh pitch P1 of the first mesh pattern MP1 can be defined by an average value of the distance between centers of two first mesh cells C1 adjacent to each other in the first direction, in the first direction. The second mesh pitch P2 of the second mesh pattern MP2 can be defined by the average value of the distances of centers of two second mesh cells C2 adjacent to each other in the first direction, in the first direction.

In a case of calculating the average value of the distances between the centers of the mesh cells adjacent to each other, with respect to the plurality of first mesh cells C1 and the plurality of second mesh cells C2 arranged in the region having a predetermined area, an average value of the distances between the centers of the mesh cells adjacent to each other can be calculated. For example, it is preferable to calculate the average value of the side length with respect to the plurality of first mesh cells C1 and the second mesh cells C2 arranged in a region of 10 mm×10 mm.

Also by causing the sizes or shapes (including angles) of the first mesh cells C1 as the constitutional units of the first mesh pattern MP1 and the second mesh cell C2 as the constitutional unit of the second mesh pattern MP2 to be different from each other, it is possible to constitute the third mesh pattern MP3 formed by the plurality of third mesh cells C3 having an irregular shape.

Subsequently, the method of forming the metal fine wires M1A, M1B, M2A, and M2B is described. As the method of forming these metal fine wires, for example, a plating method, a silver salt method, a vapor deposition method, a printing method, and the like can be suitably used.

The method of forming the metal fine wires by the plating method is described. For example, the fine metal wire can be constituted by using a metal plating film formed on the underlayer by performing electroless plating on the electroless plating underlayer. In this case, the metal fine wires are formed by forming a pattern shape on the substrate with catalyst ink containing at least metal fine particles, then immersing the substrate in an electroless plating bath, and forming a metal plating film. More specifically, the method for manufacturing a metal-coated substrate disclosed in JP2014-159620A can be used. The metal fine wires are formed by forming a pattern shape on the substrate with a resin composition having at least a functional group capable of interacting with a metal catalyst precursor, applying a catalyst or a catalyst precursor, immersing the substrate in an electrolessly plate bath, and forming a metal plating film. More specifically, the method of manufacturing a metal-coated substrate disclosed in JP2012-144761A can be applied.

The method of forming metal thin lines by the silver salt method is described. First, an exposure treatment is performed on a silver halide emulsion layer including silver halide by using an exposure pattern to be metal fine wires, and then a development treatment is performed, so as to form the fine metal wires. More specifically, methods of manufacturing metal fine wires disclosed in JP2012-006377A, JP20141-112512A, JP2014-209332A, JP2015-022397A, JP2016-192200A, and WO2016/157585A can be used.

The method of forming metal thin wires by the vapor deposition method is described. First, a copper thin layer can be formed by vapor deposition, and copper wires are formed of the copper thin layer by photolithography, so as to form metal fine wires. In addition to the vapor deposited copper thin layer, an electrolytic copper thin layer can be used as the copper thin layer. More specifically, a step of forming copper wires disclosed in JP2014-29614A can be used.

The method of forming the metal thin wire by the printing method is described. First, a conductive paste containing conductive powders is applied to a substrate so as to have the same pattern as the metal thin wires, and then the heat treatment is performed, so as to form the metal thin wires. In the pattern formation by using a conductive paste, for example, an inkjet method or a screen printing method can be used. More specifically, a conductive paste disclosed in JP2011-28985A can be used as the conductive paste.

<Protective Layer>

As the transparent protective layers 7A and 7B, organic films of gelatin, an acrylic resin, a urethane resin, or the like, and inorganic films of silicon dioxide or the like can be used, and the film thickness is preferably 10 nm to 10,000 nm.

If necessary, a transparent coating layer may be formed on the protective layer. As the transparent coat layer, an organic film of an acrylic resin, a urethane resin, or the like is used, and the film thickness thereof is preferably 1 μm to 100 μm.

As a material of the cover panel 3 constituting the touch panel 2, tempered glass, polycarbonate, polyethylene terephthalate, polymethyl methacrylate resin (PMMA), or the like can be used, and the thickness of the cover panel 3 is preferably 0.1 to 1.5 mm. A decorative layer that shields the edge part region S2 may be formed on the cover panel 3 to.

As the transparent adhesive 4 for bonding the conductive member 1 to the cover panel 3, an optical transparent pressures sensitive adhesive sheet (Optical Clear Adhesive: OCA) or an optical transparent pressures sensitive adhesive resin (Optical Clear Resin: OCR) can be used, and the preferable film thickness is 10 μm to 200 μm. As the optical transparent pressures sensitive adhesive sheet, for example, 8146 series manufactured by The 3M Company can be used.

<Edge Part Wire Insulating Film>

For the purpose of preventing shorting between edge part wires and corrosion of the edge part wires, an edge part wire insulating film may be formed on the first edge part wires 12 and the second edge part wires 22 as illustrated in FIG. 2. As the edge part wire insulating film, an organic film of an acrylic resin, a urethane resin, or the like is used, and the film thickness is preferably 1 μm to 30 μm. The edge part wire insulating film may be formed only on one of the first edge part wires 12 and the second edge part wires 22.

Here, as an example, a method of forming the metal thin wires by the silver salt method and manufacturing the conductive member 1 is specifically described.

(Preparation of Silver Halide Emulsion)

The following solutions 2 and 3 were added by an amount corresponding to 90% each to the following solution 1 kept at a temperature of 38° C. and pH (potential of hydrogen) of 4.5 with stirring over 20 minutes, so as to form nuclear particles of 0.16 μm. Subsequently, the following solutions 4 and 5 were added over 8 minutes, and the following solutions 2 and 3 were added each by an amount of the remaining 10% over two minutes, so as to grow particles to 0.21 μm. Further, 0.15 g of potassium iodide was added and aged for five minutes so as to complete particle formation.

Solution 1:

| | |
|---|---|
| Water | 750 ml |
| Gelatin | 9 g |
| Sodium chloride | 3 g |
| 1,3-Dimethylimidazolidine-2-thione | 20 mg |
| Sodium benzenethiosulfonate | 10 mg |
| Citric acid | 0.7 g |

Solution 2:

| Water | 300 ml |
|---|---|
| Silver nitrate | 150 g |

Solution 3:

| Water | 300 ml |
|---|---|
| Sodium chloride | 38 g |
| Potassium bromide | 32 g |
| Potassium hexachloro iridiumate (III) (0.005% KCl 20% aqueous solution) | 8 ml |
| Hexachlororhodate ammonium (0.001% NaCl 20% aqueous solution) | 10 ml |

Solution 4:

| Water | 100 ml |
|---|---|
| Silver nitrate | 50 g |

Solution 5:

| Water | 100 ml |
|---|---|
| Sodium chloride | 13 g |
| Potassium bromide | 11 g |
| Yellow blood salt | 5 mg |

Thereafter, washing with water was performed by a flocculation method according to a general method. Specifically, the temperature was decreased to 35° C., 3 liters of distilled water was added, and sulfuric acid was used to lower the pH until the silver halide was precipitated (in the range of pH 3.6±0.2). Next, about 3 liters of the supernatant was removed (first washing with water). Additional 3 liters of distilled water was added, and sulfuric acid was added, until the silver halide had precipitated. Again, 3 liters of the supernatant was removed (second washing with water). The same operation as the second washing with water was further repeated one more time (third washing with water) to complete a water washing-desalting step. The emulsion after washing and desalting was adjusted to pH 6.4 and pAg 7.5, 3.9 g of gelatin, 10 mg of sodium benzenethiosulfonate, 3 mg of sodium benzenethiosulfinate, 15 mg of sodium thiosulfate, and 10 mg of chloroauric acid were added, chemical sensitization was performed so as to obtain the optimum sensitivity at 55° C., and 100 mg of 1,3,3a, 7-tetraazaindene as a stabilizer and 100 mg of PROXEL (trade name, manufactured by ICI Co., Ltd.) as a preservative were added. The finally obtained emulsion was a silver iodochlorobromide cubic grain emulsion including 0.08 mol % of silver iodide, having a proportion of silver chlorobromide of 70 mol % of silver chloride and 30 mol % of silver bromide, and having an average particle diameter of 0.22 μm and a coefficient of variation of 9%.

(Preparation of Composition for Forming Photosensitive Layer)

$1.2 \times 10^{-4}$ mol/mol Ag of 1,3,3a, 7-tetraazaindene, $1.2 \times 10^{-2}$ mol/mol Ag of hydroquinone, $3.0 \times 10^{-4}$ mol/mol Ag of citric acid, 0.90 g/mol Ag of 2,4-dichloro-6-hydroxy-1,3,5-triazine sodium salt, and a slight amount of a hardener were added to the above emulsion, and pH of the coating solution was adjusted to 5.6 by using citric acid.

A polymer latex containing a polymer represented by (P-1) and dialkylphenyl PEO sulfate ester as a dispersing agent with respect to gelatin contained in the above coating solution (a mass ratio of dispersing agent/polymer was 2.0/100=0.02) was added such that polymer/gelatin (mass ratio)=0.5/1 was satisfied.

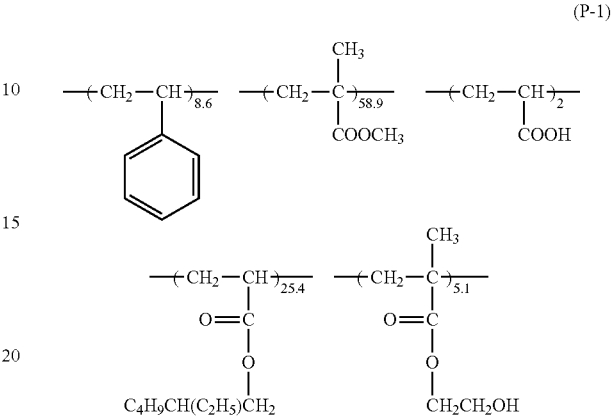

(P-1)

EPOXY RESIN DY 022 (trade name, manufactured by Nagase ChemteX Corp.) was added as a crosslinking agent. The addition amount of the crosslinking agent was adjusted such that the amount of the crosslinking agent in the photosensitive layer described below was 0.09 g/m².

The composition for forming a photosensitive layer was prepared as above.

The polymer represented by (P-1) described above was synthesized with reference to JP3305459B and JP3754745B.

(Photosensitive Layer Formation Step)

Both sides of the transparent insulating substrate 5 were coated with the above polymer latex, so as to provide an undercoat layer having a thickness of 0.05 μm. As the transparent insulating substrate 5, polyethylene terephthalate (PET) film of 38 μm (manufactured by Fujifilm Corporation) was used.

Next, an antihalation layer was formed of a mixture of the above polymer latex, gelatin, and a dye having an optical density of about 1.0 and being decolorized by alkali of a developer was provided on the undercoat layer. The mixing mass ratio (polymer/gelatin) of the polymer and the gelatin in the antihalation layer was 2/1, and the content of the polymer was 0.65 g/m².

The antihalation layer was coated with the composition for forming a photosensitive layer and was further coated with a composition obtained by mixing the polymer latex, gelatin, EPOCROSS K-2020E (trade name, manufactured by Nippon Shokubai Co., Ltd., oxazoline-based crosslinking reactive polymer latex) (crosslinkable group: oxazoline group)), and SNOWTEX C (registered trademark, trade name, manufactured by Nissan Chemical Industries, Ltd., colloidal silica) by a solid content mass ratio (polymer/gelatin/EPOCROSS K-2020E/SNOWTEX C (registered trademark)) of 1/1/0.3/2 such that the amount of gelatin was 0.08 g/m², so as to obtain a support of which photosensitive layers were formed on both sides. A support having photosensitive layers formed on both sides is referred to as a film A. The formed photosensitive layer had a silver content of 6.2 g/m² and a gelatin content of 1.0 g/m².

(Exposure and Development Step)

A first photo mask having a pattern as illustrated in FIG. 3 and a second photo mask having a pattern as illustrated in FIG. 7 were respectively formed, the first photo mask and the second photo mask were arranged on both sides of the film A, and the both sides were simultaneously exposed with parallel light by using a high pressure mercury lamp as a light source.

After the exposure, development was performed by using the following developer, and development was performed by using a fixing solution (trade name, N3X-R for CN16X, manufactured by Fujifilm Corporation). Rinsing with pure water was performed, and the water was dried, so as to obtain a support in which metal fine wires made of Ag (silver) and gelatin layers were formed on both surfaces. The gelatin layer was formed between the metal wires. The obtained film was referred to as a film B.

(Composition of Developer)

The following compounds were contained in 1 liter (L) of the developer.

| | |
|---|---|
| Hydroquinone | 0.037 mol/L |
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

(Gelatin Degradation Treatment)

The film B was immersed in an aqueous solution (concentration of proteolytic enzyme: 0.5 mass %, solution temperature: 40° C.) of a proteolytic enzyme (BIOPLASE AL-15FG manufactured by Nagase ChemteX Corp.) in an aqueous solution for 120 seconds. The film B was extracted from the aqueous solution, immersed in warm water (solution temperature: 50° C.) for 120 seconds, and washed. The film after gelatin degradation treatment is referred to as a film C.

(Resistance Reduction Treatment)

A calender treatment was performed on the film C by using a calender device equipped with metal rollers at a pressure of 30 kN. At this point, two PET films having a rough surface shape of line roughness Ra=0.2 μm, Sm=1.9 μm (measured with a shape analysis laser microscope VK-X110 manufactured by Keyence Corporation (JIS-B-0601-1994)) were transported such that the rough surfaces face the front and back surfaces of the film C, and the rough shapes were transferred and formed on the front and back surfaces of the film C.

After the calender treatment, the film C was passed through an overheated steam tank at a temperature of 150° C. for 120 seconds to perform heat treatment. The film after the heat treatment is referred to as a film D. This film D was a conductive member 1.

In the embodiment, a configuration in which the first electrodes 11 and the second electrodes 21 formed of metal fine wires are arranged on both surfaces of the transparent insulating substrate 5 illustrated in FIG. 1 is described, but the present invention is not limited to the configuration. The present invention may have a configuration in which the first electrodes 11 and the second electrodes 21 are insulated from the transparent insulating member, may be a configuration in which two sheets of electrode substrates illustrated in FIG. 11 of JP2016-126731A are bonded via a transparent pressures sensitive adhesive layer, or may be a configuration in which column wires and row wires are provided on a transparent substrate via an interlayer insulation film as illustrated in FIG. 4 of JP2010-97536A. In the former case, the electrode substrate and the transparent pressures sensitive adhesive layer constitute the transparent insulating member, and in the latter case, the interlayer insulation film corresponds to the transparent insulating member.

EXPLANATION OF REFERENCES

1: conductive member
2: touch panel
3: cover panel
4: adhesive
5: transparent insulating substrate
5A: first surface
5B: second surface
6A, 6B: metal fine wire
7A, 7B: transparent protective layer
11: first electrode
11A: first detection electrode portion
11B: dummy portions in a first electrode
12: first edge part wire
13: first external connection terminal
14: first connector portion
21: second electrode
21A: second detection electrode portion
21B: dummy portion in a second electrode
22: second edge part wire
23: second external connection terminal
24: second connector portion
S1: transmissive region
S2: edge part region
D1: first direction
D2: second direction
M1A, M1B, M2A, M2B: metal fine wire
G1, G2: gap
W1A, W1B, W2A, W2B: line width
R0, R1, R2: region
T1A: first detection unit pattern
T1B: first dummy unit pattern
T2A: second detection unit pattern
T2B: second dummy unit pattern
MP1: first mesh pattern
MP2: second mesh pattern
MP3: third mesh pattern
C1: first mesh cell
C2: second mesh cell
C3: third mesh cell
P1: first mesh pitch
P2: second mesh pitch
P3: third mesh pitch
ΔL: distance

What is claimed is:

1. A conductive member having a transmissive region, comprising:
    a transparent insulating member;
    a plurality of first electrodes each of which extends in a first direction and which are arranged in juxtaposition in a second direction orthogonal to the first direction; and
    a plurality of second electrodes each of which extends in the second direction and which are arranged in juxtaposition in the first direction,
    wherein the plurality of first electrodes and the plurality of second electrodes are opposed to each other with the transparent insulating member interposed therebetween,
    the first electrode has a first detection electrode portion which is formed of metal fine wires, and a dummy portion in the first electrode which is formed of metal fine wires and arranged to be insulated from the first detection electrode portion, the second electrode has a second detection electrode portion which is formed of metal fine wires, and a dummy portion in the second electrode which is formed of metal fine wires and arranged to be insulated from the second detection electrode portion, and in a region in which the first electrode and the second electrode are overlapped with each other, the first detection electrode portion and the dummy portion in the second electrode are combined with each other to form a first mesh pattern constituted by a plurality of first mesh cells, the second detection electrode portion and the dummy portion in the first electrode are combined with each other to form a second mesh pattern constituted by a plurality of second mesh cells, and the first mesh pattern and the second mesh pattern are combined with each other to form a third mesh pattern constituted by a plurality of third mesh cells.

2. The conductive member according to claim 1,
wherein the first mesh pattern has a first mesh pitch,
the second mesh pattern has a second mesh pitch,
the metal fine wires that form the first mesh pattern and the metal fine wires that form the second mesh pattern are arranged at positions different from each other except for a portion in which the fine wires are overlapped with each other in a dot shape, and
the third mesh pattern has a third mesh pitch smaller than the first mesh pitch and the second mesh pitch.

3. The conductive member according to claim 2,
wherein the first mesh pitch and the second mesh pitch are the same,
the second mesh pattern is arranged at a position deviated by ½ of each of the first mesh pitch from the first mesh pattern, and
the third mesh pitch has a value of ½ of each of the first mesh pitch and the second mesh pitch.

4. The conductive member according to claim 1,
wherein the first detection electrode portion has a repeating pattern in which a first detection unit pattern is used as a constitutional unit,
the dummy portion in the first electrode has a repeating pattern in which a first dummy unit pattern arranged in the first detection unit pattern is used as a constitutional unit,
the second detection electrode portion has a repeating pattern in which a second detection unit pattern having the same size as the first detection unit pattern is used as a constitutional unit, and
the dummy portion in the second electrode has a repeating pattern in which a second dummy unit pattern arranged in the second detection unit pattern is used as a constitutional unit.

5. The conductive member according to claim 1,
wherein the first mesh cell, the second mesh cell, and the third mesh cell have a shape of quadrangle.

6. The conductive member according to claim 5,
wherein the quadrangle is a rhombus.

7. The conductive member according to claim 5,
wherein the first mesh cell and the second mesh cell have the same shape.

8. The conductive member according to claim 1,
wherein a length of a side of the third mesh cell has an irregular value of −10% to +10% with respect to an average value of a length of a side of the plurality of third mesh cells constituting the third mesh pattern.

9. A touch panel using the conductive member according to claim 1.

* * * * *